US008625272B2

(12) United States Patent
Huang et al.

(10) Patent No.: US 8,625,272 B2
(45) Date of Patent: Jan. 7, 2014

(54) PORTABLE ELECTRONIC DEVICE

(75) Inventors: Cheng-Min Huang, Taipei (TW); Nicolas Francisco Gonzalez Garrido, Taipei (TW); Wen-Hsien Chiang, Taipei (TW); Yung-Hsiang Chen, Taipei (TW); Cheng-Hao Li, Taipei (TW)

(73) Assignee: Compal Electronics, Inc., Taipei (TW)

( * ) Notice: Subject to any disclaimer, the term of this patent is extended or adjusted under 35 U.S.C. 154(b) by 295 days.

(21) Appl. No.: 13/170,209

(22) Filed: Jun. 28, 2011

(65) Prior Publication Data

US 2012/0106068 A1 May 3, 2012

Related U.S. Application Data

(60) Provisional application No. 61/409,923, filed on Nov. 3, 2010.

(51) Int. Cl.
*G06F 1/16* (2006.01)

(52) U.S. Cl.
USPC ...... 361/679.41; 439/638; 439/660; 439/668; 439/669

(58) Field of Classification Search
USPC .............. 361/679.41; 439/638, 668, 669, 660
See application file for complete search history.

(56) References Cited

U.S. PATENT DOCUMENTS

| 5,459,637 | A  | * | 10/1995 | Ma et al. ................. 361/679.41 |
| 6,319,031 | B1 | * | 11/2001 | Greenstein .................... 439/205 |
| 6,426,872 | B1 | * | 7/2002 | Sutton et al. ............. 361/679.41 |
| 6,952,344 | B2 | * | 10/2005 | Weng ....................... 361/679.41 |
| 8,068,337 | B2 | * | 11/2011 | Yao et al. ................. 361/679.43 |
| 8,367,928 | B2 | * | 2/2013 | Hsu et al. ......................... 174/50 |
| 8,441,787 | B2 | * | 5/2013 | Pine ......................... 361/679.41 |
| 2005/0037669 | A1 | * | 2/2005 | Abundis ........................ 439/638 |
| 2006/0274495 | A1 | * | 12/2006 | Nakamura et al. ............ 361/686 |
| 2009/0091477 | A1 | * | 4/2009 | McCall et al. ................ 340/990 |
| 2010/0151738 | A1 | * | 6/2010 | Chou ............................ 439/638 |
| 2011/0242754 | A1 | * | 10/2011 | Morton .................... 361/679.41 |

FOREIGN PATENT DOCUMENTS

TW      I311902      7/2009
TW      I319701      1/2010

* cited by examiner

*Primary Examiner* — Lisa Lea Edmonds
(74) *Attorney, Agent, or Firm* — Jianq Chyun IP Office

(57) ABSTRACT

A portable electronic device capable of signal or power transmission and standing on a surface in a vertical or near-vertical orientation at the same time is provided in the present invention. The portable electronic device includes a flat body having a front surface, a rear surface opposite to the front surface, and a through hole passing through the flat body, and the through hole extending from the front surface to the rear surface. Herein the through hole is adapted to couple with an external docking element for signal or power transmission. Thus, the portable electronic device is capable of signal or power transmission and standing on the supporting surface at the same time via the external docking element coupling with the through hole.

38 Claims, 11 Drawing Sheets

PORTABLE ELECTRONIC DEVICE

CROSS-REFERENCE TO RELATED APPLICATION

This application claims the priority benefit of U.S. Provisional Application Ser. No. 61/409,923, filed Nov. 3, 2010. The entirety of the above-mentioned patent application is hereby incorporated by reference herein and made a part of this specification.

BACKGROUND OF THE INVENTION

1. Field of the Invention

The present invention generally relates to portable electronic devices. More particularly, the present invention relates to a portable electronic device capable of signal or power transmission and standing on a surface in a vertical or near-vertical orientation at the same time.

2. Description of Related Art

Along with the development of technology, portable electronic devices, such as tablet personal computer (tablet PC), electronic reader (E-Reader) and smart phone, have been greatly improved both in function and in product appearance. Currently, in addition to the basic functions of the portable electronic device, the network access function, the audio/video file playing function, the photography function, the video recording function and game-playing function have also become indispensable functions to be fashionable.

It is to be noted that when the portable electronic device is operating the functions such as, playing an audio/video file, recording a video, network access or playing games, the display area of the portable electronic device is usually faced to the user. At this moment, it is necessary to support the portable electronic device by hands, supporting components, base, wall or the like things enable to support the device to stand and face the display area to the user. In general, it would become inconvenient for a user if the portable electronic device has to be supported as above mentioned for a continually long period of time during enjoying the audio/video file playing, operating the video recording function or operating other functions.

Furthermore, since the things enable to support the portable electronic device are not widely available, the users have to hold the portable electronic device as long as they are watching the audio/video file playing or operating other functions. Thus, it is easy to make users to feel uncomfortable to hold the portable electronic device for such a continually long period of time and it is inconvenient in the use of the portable electronic device in this way.

SUMMARY OF THE INVENTION

The present invention provides a portable electronic device including a flat body having a front surface, a rear surface opposite to the front surface, and a through hole passing through the flat body, and the through hole extending from the front surface to the rear surface. Herein the through hole is adapted to couple with an external docking element for signal or power transmission.

The present invention further provides a portable electronic device including a flat body and an external docking element. The flat body has a front surface, a rear surface opposite to the front surface, and a through hole passing through the flat body, and the through hole extending from the front surface to the rear surface. The external docking element has an inserting portion and a stem portion. Herein the external docking element is adapted to couple with the flat body by inserting the inserting portion into the through hole for signal or power transmission and supporting the flat body to stand on a supporting surface.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
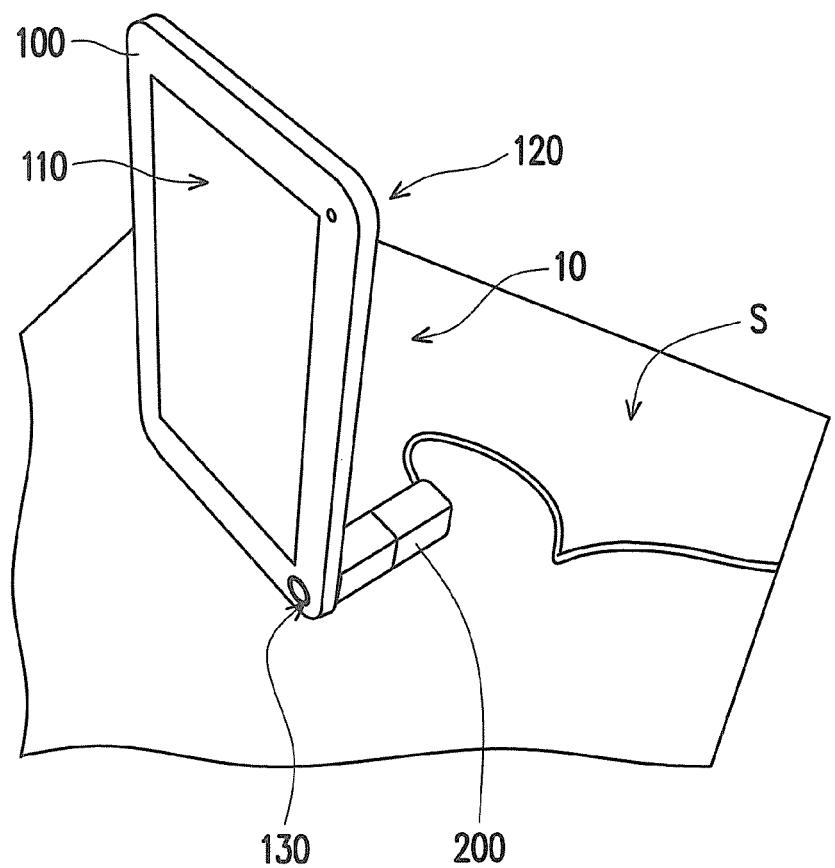
FIG. 1A illustrates a portable electronic device standing on a supporting surface according to an embodiment of the present invention.
Figure 1B:
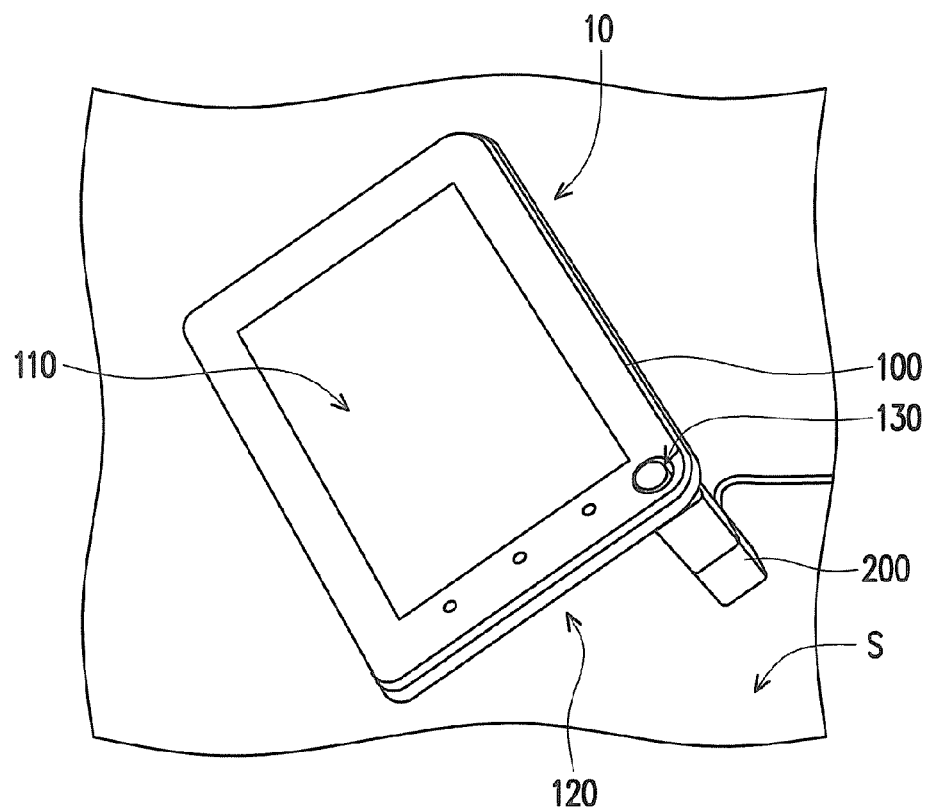
FIG. 1B illustrates another standing posture of the portable electronic device of FIG. 1A.

FIG. 1A illustrates a portable electronic device standing on a supporting surface according to an embodiment of the present invention. FIG. 1B illustrates another standing posture of the portable electronic device of FIG. 1A. Referring to FIG. 1A and FIG. 1B, according to an embodiment of the present invention, the portable electronic device 10 includes a flat body 100. The flat body 100 is adapted to couple with an external docking element 200 for signal or power transmission as well as for supporting the flat body 100 to stand on a supporting surface S. In another embodiment, the portable electronic device 10 may include a flat body 100 and an external docking element 200. In the embodiment, the external docking element 200 is adapted to couple with the flat body 100 for signal or power transmission and supporting the flat body 100 to stand on the supporting surface S.

Figure 2:
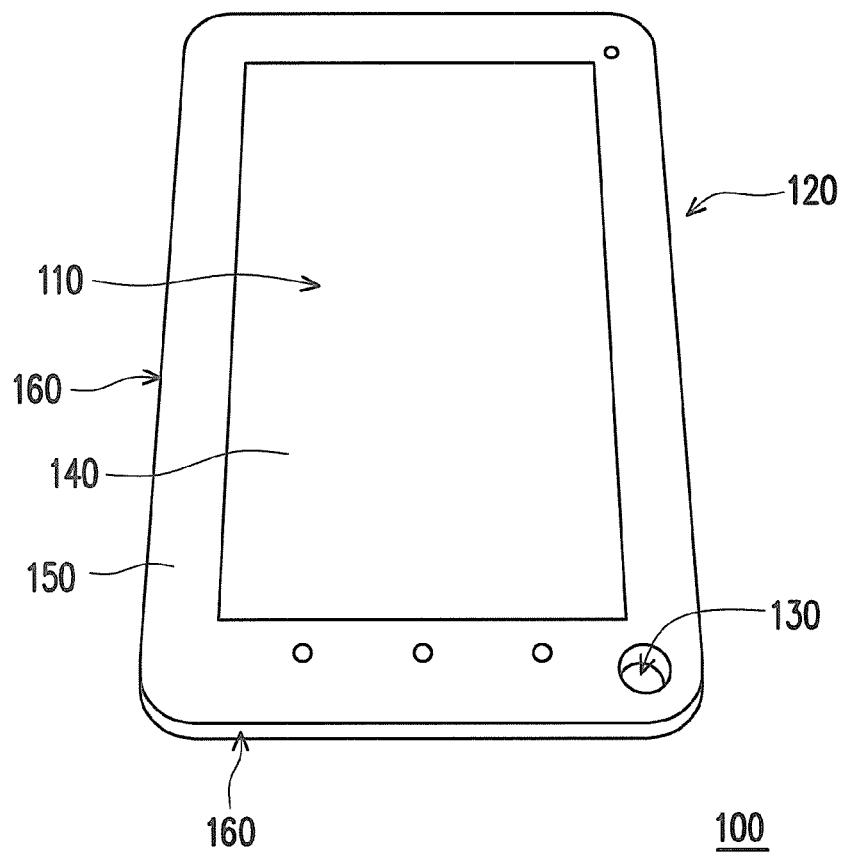
FIG. 2 illustrates the flat body of the portable electronic device of FIG. 1A.

FIG. 2 illustrates the flat body of the portable electronic device of FIG. 1A. As shown in FIG. 2, the flat body 100 has a front surface 110, a rear surface 120 opposite to the front surface 110, and a through hole 130 passing through the flat body 100. The through hole 130 extends from the front surface 110 to the rear surface 120. The flat body 100 further includes a display area 140 on the front surface 110 and a non-display area 150 on the front surface 110 and surrounding the display area 140. The through hole 130 is located at the non-display area 150. In this embodiment, the through hole 130 is disposed at a corner of the flat body 100. It has to be noticed that the through hole 130 may be disposed at any other suitable place of the flat body 100, and the present invention is not limited thereto. Additionally, the flat body 100 has a side edge 160 adapted to lean on the supporting surface S when the flat body 100 is supported by the external docking element 200 to stand on the supporting surface S, as shown in FIG. 1A and FIG. 1B.

Figure 3:
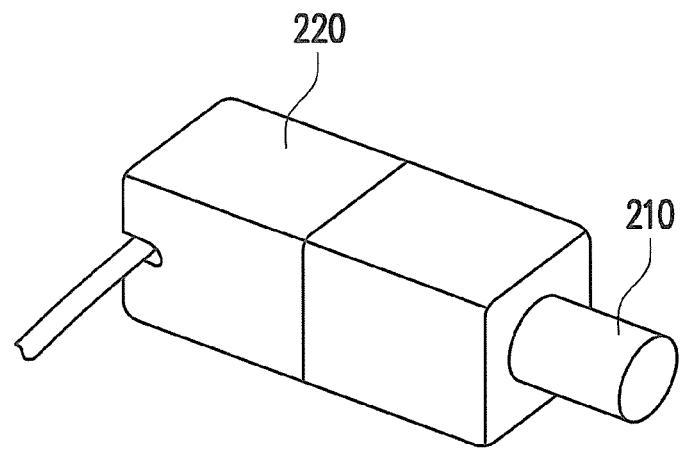
FIG. 3 illustrates the external docking element of the portable electronic device of FIG. 1A.

FIG. 3 illustrates the external docking element of the portable electronic device of FIG. 1A. Referring to FIG. 3, the external docking element 200 has an inserting portion 210 and a stem portion 220. Herein the external docking element 200 is adapted to couple with the flat body 100 by inserting the inserting portion 210 into the through hole 130 for signal or power transmission and supporting the flat body 100 to stand on the supporting surface S. In other words, the portable electronic device 10 can stand on the supporting surface S while operating its functions. In addition, the external docking element 200 can be a universal serial bus (USB) device, an adaptor, a battery or a joystick or the like, for example. It will be a signal transmission when the external docking element 200 is a universal serial bus or a joystick, and it will be a power transmission when the external docking element 200 is an adaptor or a battery. And the portable electronic device 10 can be, for example, a tablet personal computer, an E-Reader or a smart phone or the like.

The followings are some exemplary descriptions of the various coupling means between the flat body 100 and the external docking element 200.

Figure 4A:
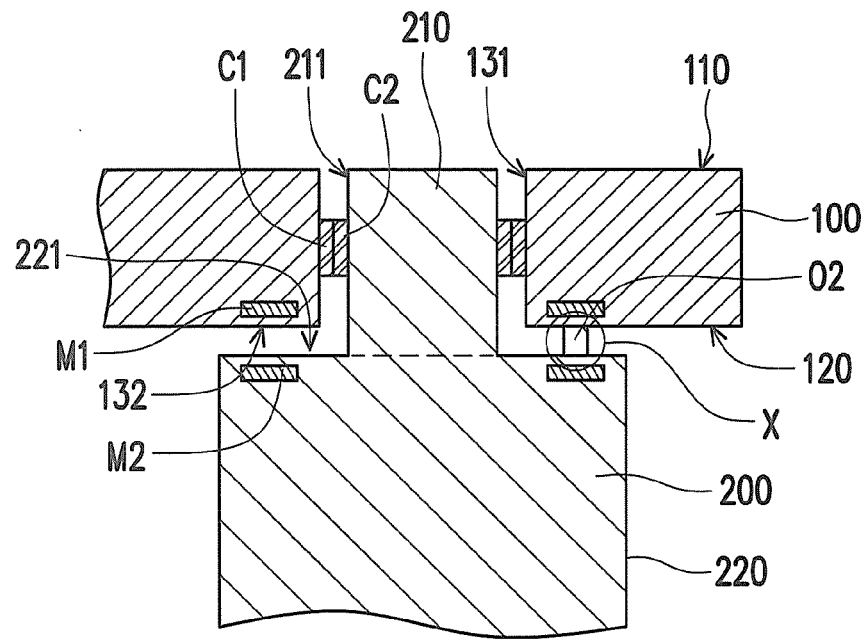
FIG. 4A illustrates an exemplary coupling means between the flat body and the external docking element of the portable electronic device of FIG. 1A.
Figure 4B:
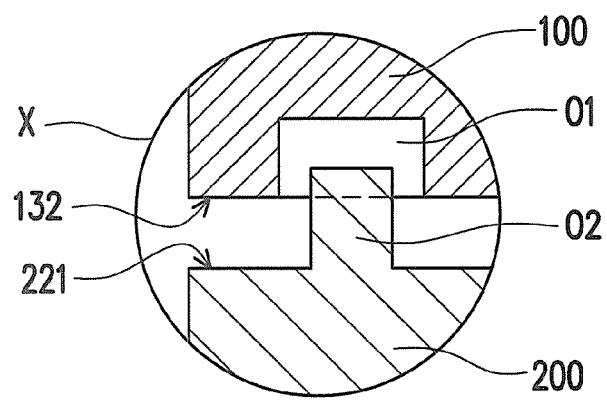
FIG. 4B is the enlargement of the X portion of FIG. 4A.
Figure 4C:
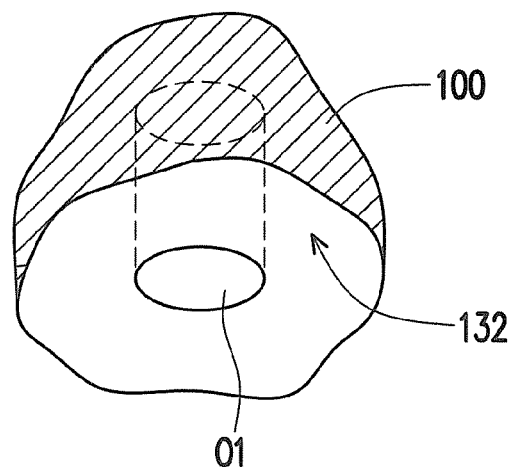
FIG. 4C illustrates the first orientation element of FIG. 4B.
Figure 4D:
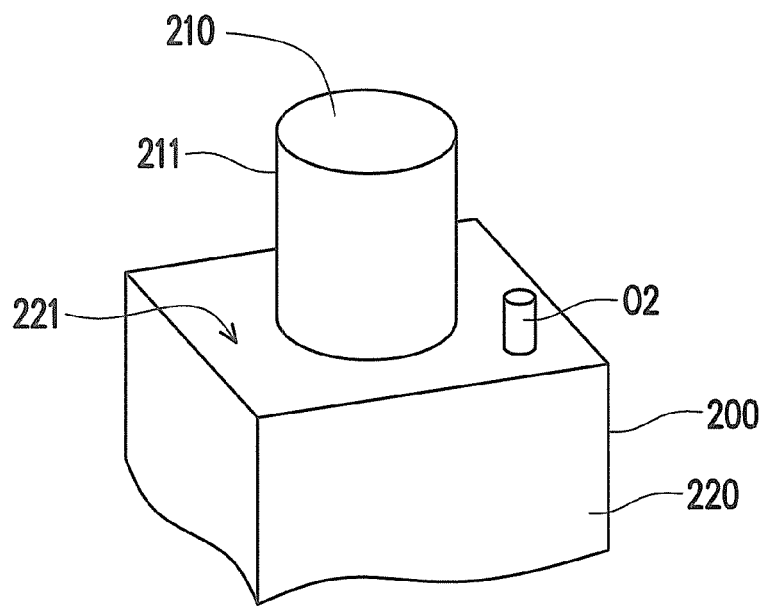
FIG. 4D illustrates the second orientation element of FIG. 4B.

FIG. 4A illustrates an exemplary coupling means between the flat body and the external docking element of the portable electronic device of FIG. 1A. FIG. 4B is the enlargement of the X portion of FIG. 4A. FIG. 4C illustrates the first orientation element of FIG. 4B. FIG. 4D illustrates the second orientation element of FIG. 4B. Please refer to FIG. 4A to 4D, the through hole 130 of the flat body 100 has an inner wall 131. The flat body 100 further includes a terminal area 132 on the rear surface 120 and adjacent to the through hole 130. The inserting portion 210 of the external docking element 200 has an outer wall 211. The stem portion 220 of the external docking element 200 has a shoulder area 221 adjacent to the inserting portion 210. The flat body 100 has a plurality of first connection terminals C1 disposed adjacent to the through hole 130. For example, the first connection terminals C1 are disposed at the inner wall 131 of the through hole 130. Correspondingly, the external docking element 200 has a plurality of second connection terminals C2 disposed adjacent to the inserting portion 210. For example, the second connection terminals C2 are disposed at the outer wall 211 of the inserting portion 210. And each of the first connection terminals C1 is adapted to connect with a corresponding second connection terminal C2 for signal or power transmission when the through hole 130 couples with the external docking element 200.

In order to ensure the connection between the flat body 100 and the external docking element 200, a magnetic adsorption is used as a connection means in this embodiment. As shown in FIG. 4A, the flat body 100 has a first magnetic element M1 disposed adjacent to the through hole 130, for example, at the terminal area 132 of the through hole 130. Correspondingly, the external docking element 200 has a second magnetic element M2 disposed adjacent to the inserting portion 210, for example, at the shoulder area 221 of the stem portion 220. The first magnetic element M1 is adapted to couple with the second magnetic element M2 through a magnetic adsorption. In this embodiment, the first magnetic element M1 can be a permanent magnetic element while the second magnetic element M2 can be a magnetic induction element such as a metal sheet. In other embodiment, the first magnetic element M1 can be a magnetic induction element while the second magnetic element M2 can be a permanent magnetic element. Or in further other embodiment, both the first magnetic element M1 and the second magnetic element M2 can be permanent magnetic elements.

Wrong orientation such as mismatch of the connection terminals is easy to happen when the external docking element 200 is coupled to the flat body 100, especially when both of the through hole 130 and the inserting portion 210 are cylindrical or symmetric. Accordingly, orientation elements are disposed to facilitate users to avoid the wrong orientation. As an example, as shown in FIG. 4B to 4D, the flat body 100 has a first orientation element O1 disposed adjacent to the through hole 130 and the external docking element 200 has a second orientation element O2 disposed adjacent to the inserting portion 210. That is, the first orientation element O1 is disposed at the terminal area 132 of the through hole and the second orientation element O2 is correspondingly disposed at the shoulder area 221 of the stem portion 220. In this embodiment, the first orientation element O1 is a notch and the second orientation element O2 is a protrusion. Or in other embodiment, the first orientation element O1 can be a protrusion and the second orientation element O2 can be a notch. It depends on the extent of convenience of manufacturing process, and the present invention is not limited thereto.

Figure 5A:
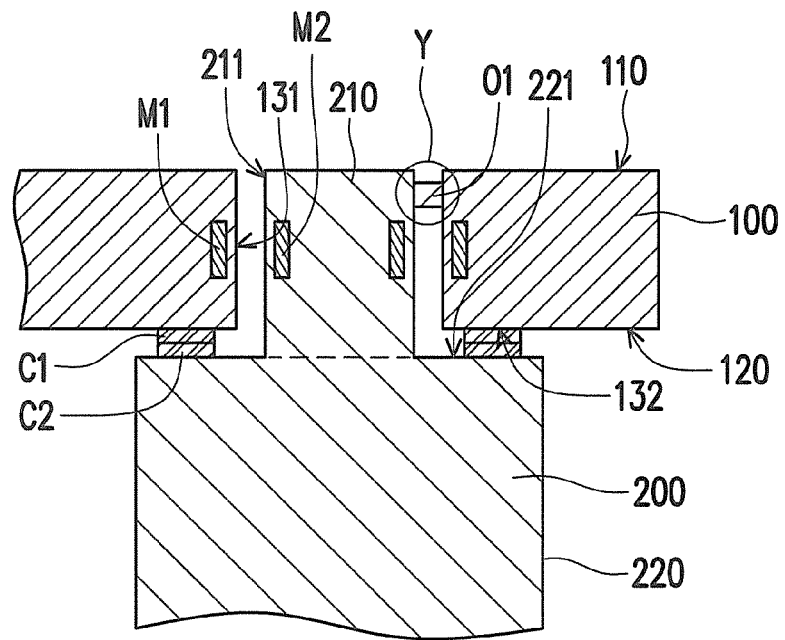
FIG. 5A illustrates an exemplary coupling means between the flat body and the external docking element of the portable electronic device of FIG. 1A.
Figure 5B:
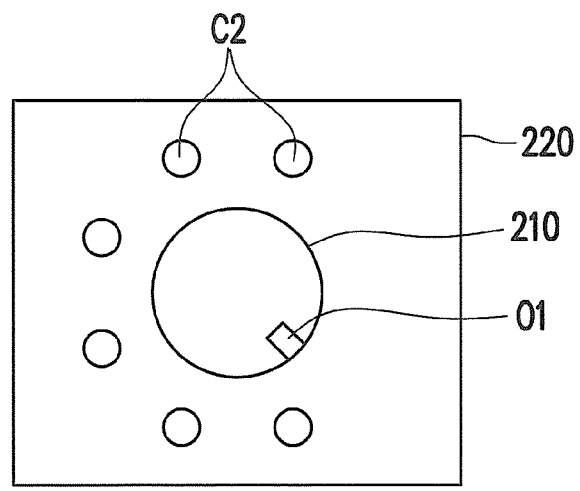
FIG. 5B is the top view of the external docking element of FIG. 5A.
Figure 5C:
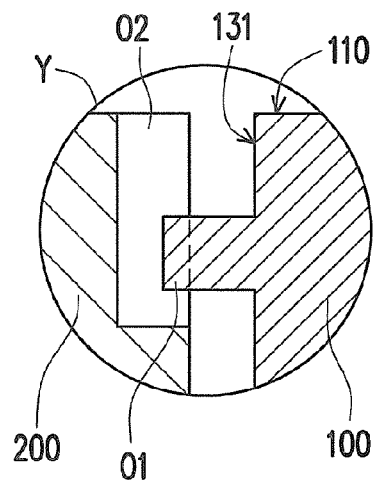
FIG. 5C is the enlargement of the Y portion of FIG. 5A.
Figure 5D:
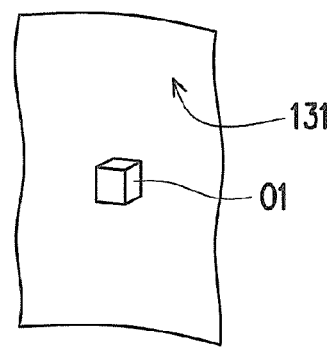
FIG. 5D illustrates the first orientation element of FIG. 5C.
Figure 5E:
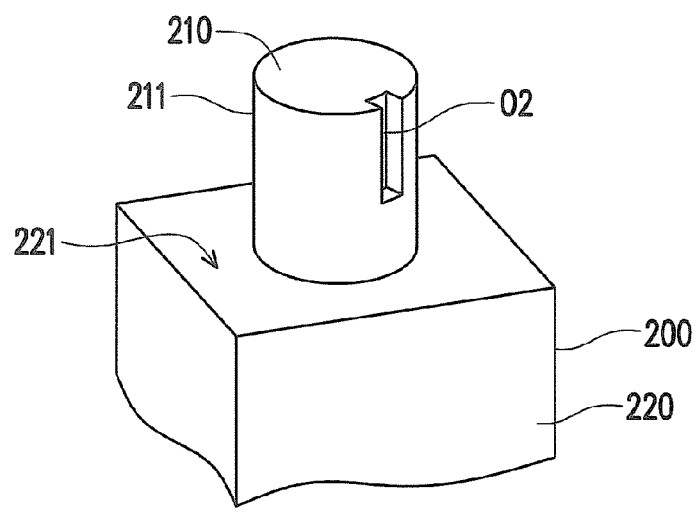
FIG. 5E illustrates the second orientation element of FIG. 5C.

Then, another exemplary connection of the flat body 100 and the external docking element 200 is described as follows. FIG. 5A illustrates an exemplary coupling means between the flat body and the external docking element of the portable electronic device of FIG. 1A. FIG. 5B is the top view of the external docking element of FIG. 5A. FIG. 5C is the enlargement of the Y portion of FIG. 5A. FIG. 5D illustrates the first orientation element of FIG. 5C. FIG. 5E illustrates the second orientation element of FIG. 5C. Referring to FIG. 5A to 5E, the flat body 100 has a plurality of first connection terminals C1 disposed at the terminal area 132 of the through hole 130. The external docking element 200 has a plurality of second connection terminals C2 disposed at the shoulder area 221 of the stem portion 220. Herein, each of the first connection terminals C1 is corresponding to each of the second connection terminals C2 for signal or power transmission when the external docking element 200 is coupled to the flat body 100.

Similarly, in order to ensure the connection between the flat body 100 and the external docking element 200, a magnetic adsorption is used as a connection means in this embodiment. As shown in FIG. 5A, the flat body 100 has a first magnetic element M1 disposed at the inner wall 131 of the through hole 130. The external docking element 200 has a second magnetic element M2 disposed correspondingly at the outer wall 211 of the inserting portion 210. The first magnetic element M1 is adapted to couple with the second magnetic element M2 through a magnetic adsorption. In this embodiment, the first magnetic element M1 can be a permanent magnetic element while the second magnetic element M2 can be a magnetic induction element such as a metal sheet. In other embodiment, the first magnetic element M1 can be a magnetic induction element while the second magnetic element M2 can be a permanent magnetic element. Or in further other embodiment, both the first magnetic element M1 and the second magnetic element M2 can be permanent magnetic elements.

Wrong orientation such as mismatch of the connection terminals is easy to happen when the external docking element 200 is coupled to the flat body 100, especially when both of the through hole and the inserting portion 210 are cylindrical or symmetric. Accordingly, similar to the above mentioned embodiment, orientation elements are disposed to facilitate users to avoid the wrong orientation. As shown in FIG. 5C to 5E, the flat body 100 has a first orientation element O1 disposed at the inner wall 131 of the through hole 130 and the external docking element 200 has a second orientation element O2 disposed at the outer wall 211 of the stem portion 210. In this embodiment, the first orientation element O1 is a protrusion and the second orientation element O2 is a groove. Or in other embodiment, the first orientation element O1 can be a groove and the second orientation element O2 can be a protrusion. It depends on the extent of convenience of manufacturing process, and the present invention is not limited thereto.

Figure 6A:
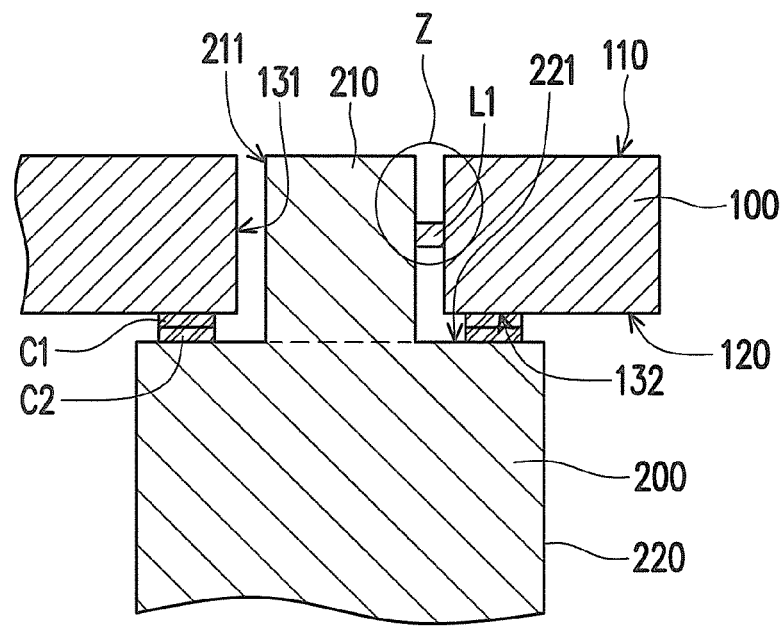
FIG. 6A illustrates an exemplary latching means between the flat body and the external docking element of the portable electronic device of FIG. 1A.
Figure 6B:
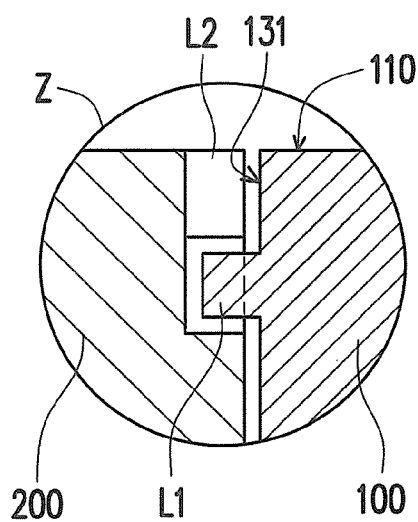
FIG. 6B is the enlargement of the Z portion of FIG. 6A.
Figure 6C:
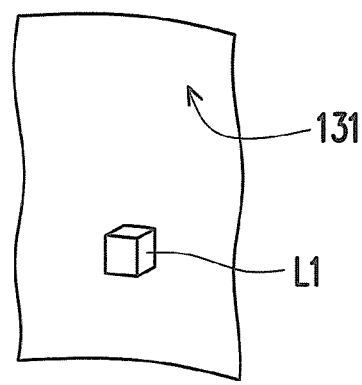
FIG. 6C illustrates the first latching element of FIG. 6B.
Figure 6D:
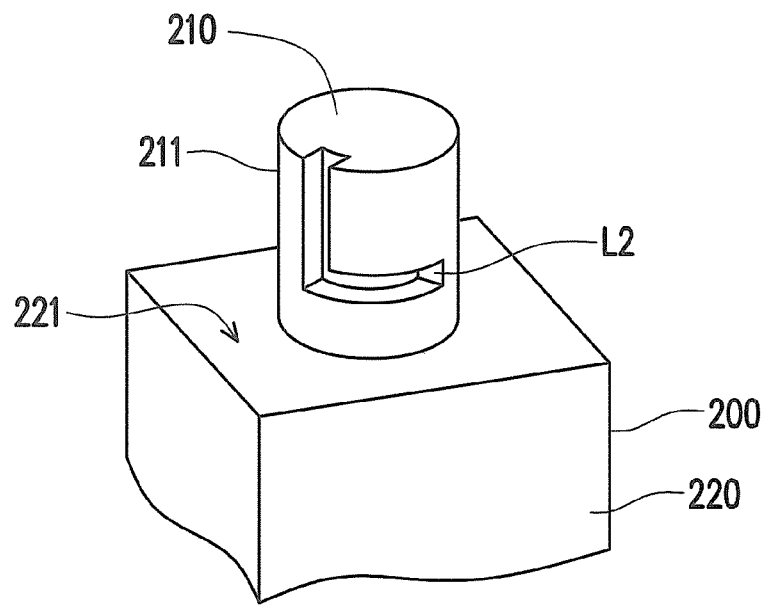
FIG. 6D illustrates the second latching element of FIG. 6B.

Besides the magnetic adsorption, another well connection means such as a latching connection between the flat body 100 and the external docking element 200 is described herein. FIG. 6A illustrates an exemplary latching means between the flat body and the external docking element of the portable electronic device of FIG. 1A. FIG. 6B is the enlargement of the Z portion of FIG. 6A. FIG. 6C illustrates the first latching element of FIG. 6B. FIG. 6D illustrates the second latching element of FIG. 6B. Please refer to FIG. 6A to 6D. The first connection terminals C1 is disposed at the terminal area 132 of the through hole 130 and the second connection terminals C2 is disposed at the shoulder area 221 of the stem portion 220 for signal or power transmission when the flat body 100 is coupled with the external docking element 200.

In order to ensure the connection between the flat body 100 and the external docking element 200, latching elements are used in this embodiment. As shown in FIG. 6B to 6D, the flat body 100 has a first latching element L1 disposed adjacent to the through hole 130, for example, at the inner wall 131 of the through hole 130. The external docking element 200 has a second latching element L2 correspondingly disposed adjacent to the inserting portion 210, for example, at the outer wall 211 of the inserting portion 210. In this embodiment, the first latching element L1 is a protrusion and the second latching element L2 is a groove. As shown in FIG. 6D, the second latching element L2 is disposed with a guiding path and a fixing path. That is, the user has to insert the inserting portion 210 into the through hole 130 by the protrusion being within the groove by means of the protrusion firstly sliding within the guiding path and then the protrusion finally being latched in the fixing path of the groove. Thus, in such configuration, it facilitates to avoid the wrong insertion and a well connection between the flat body 100 and the external docking element 200 can be obtained.

Figure 7A:
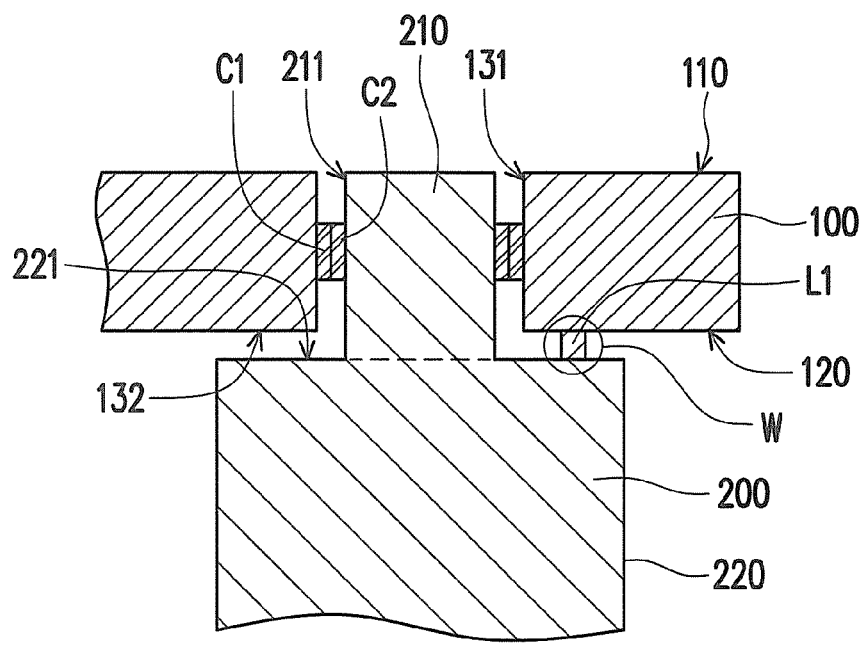
FIG. 7A illustrates another exemplary latching means between the flat body and the external docking element of the portable electronic device of FIG. 1A.
Figure 7B:
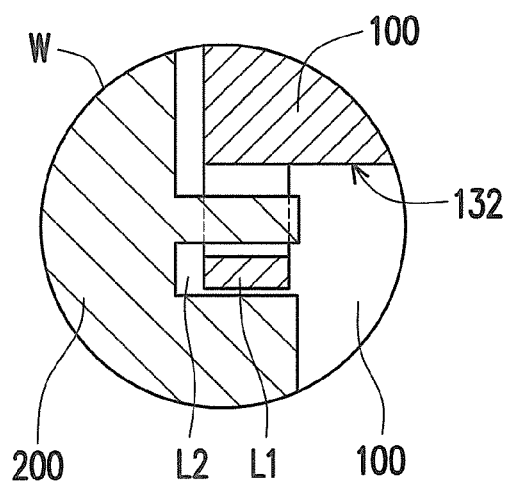
FIG. 7B is the enlargement of the W portion of FIG. 7A.
Figure 7C:
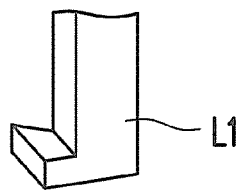
FIG. 7C illustrates the first latching element of FIG. 7B.
Figure 7D:
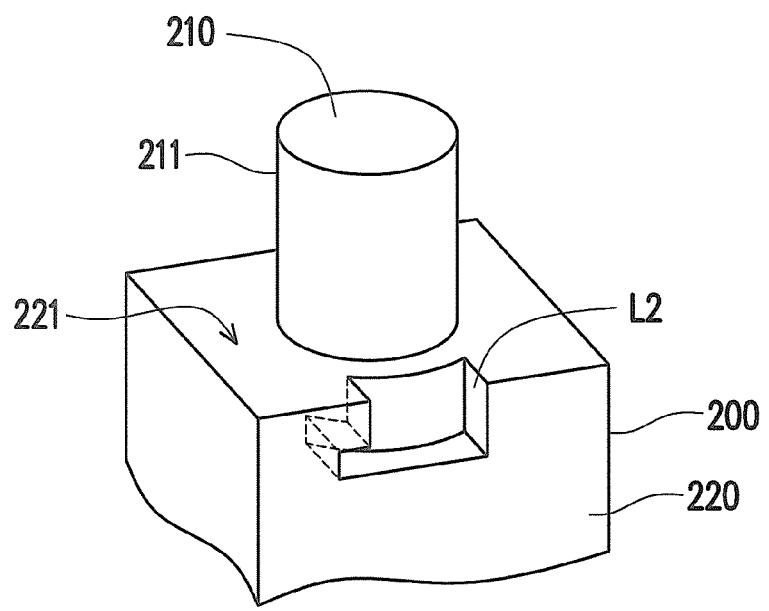
FIG. 7D illustrates the second latching element of FIG. 7B.

And then, another latching connection between the flat body 100 and the external docking element 200 is described as following. FIG. 7A illustrates another exemplary latching means between the flat body and the external docking element of the portable electronic device of FIG. 1A. FIG. 7B is the enlargement of the W portion of FIG. 7A. FIG. 7C illustrates the first latching element of FIG. 7B. FIG. 7D illustrates the second latching element of FIG. 7B. Please refer to FIG. 7A to 7D. The first connection terminals C1 is disposed at the inner wall 131 of the through hole 130 and the second connection terminals C2 is disposed at the outer wall 211 of the inserting portion 210 for signal or power transmission when the flat body 100 is coupled with the external docking element 200.

Likewise, in order to ensure the connection between the flat body 100 and the external docking element 200, latching elements are used in this embodiment. As shown in FIG. 7B to 7D, the flat body 100 has a first latching element L1 disposed at the terminal area 132 of the through hole 130. The external docking element 200 has a second latching element L2 correspondingly disposed at the shoulder area 221 of the stem portion 220. In this embodiment, the first latching element L1 is a protrusion as shown in FIG. 7C and in an L shape. The second latching element L2 is a groove as shown in FIG. 7D. The second latching element L2 is disposed with a guiding path and a fixing path. That is, the user has to insert the inserting portion 210 into the through hole 130 by the protrusion being within the groove by means of the protrusion firstly sliding within the guiding path and then the protrusion finally being latched in the fixing path of the groove. Thus, this configuration also facilitates users to avoid the wrong insertion and a well connection between the flat body 100 and the external docking element 200 can be obtained.

In summary, the present invention provides a portable electronic device capable of signal or power transmission and standing on a surface in a vertical or near-vertical orientation at the same time. The portable electronic device provided in the present invention is capable of signal or power transmission via the external docking element coupling with the through hole, and at the same time it is also capable of standing on a surface in a vertical or near-vertical orientation via the external docking element coupling with the through hole. Since the portable electronic device is configured with a wrong insertion preventing mechanism, it facilitates users to avoid the wrong insertion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
   a flat body having a front surface, a rear surface opposite to the front surface, a through hole passing through the flat body and extending from the front surface to the rear surface, a plurality of first connection terminals disposed adjacent to the through hole, and a terminal area on the rear surface and adjacent to the through hole,
   wherein the through hole is adapted to couple with an external docking element for signal or power transmission, and the first connection terminals disposed at the terminal area are adapted to contact with a plurality of second connection terminals of the external docking element for signal or power transmission when the through hole couples with the external docking element.

2. The portable electronic device as claimed in claim 1, wherein the flat body has a first magnetic element disposed adjacent to the through hole, and the first magnetic element is adapted to couple with a second magnetic element of the external docking element through a magnetic adsorption.

3. The portable electronic device as claimed in claim 2, wherein the through hole has an inner wall, and the first magnetic element is disposed at the inner wall.

4. The portable electronic device as claimed in claim 2, wherein the flat body has a terminal area on the rear surface and adjacent to the through hole, and the first magnetic element is disposed at the terminal area.

5. The portable electronic device as claimed in claim 2, wherein the first magnetic element and the second magnetic element are a permanent magnetic element and a magnetic induction element respectively or are a magnetic induction element and a permanent magnetic element respectively, or both are permanent magnetic elements.

6. The portable electronic device as claimed in claim 2, wherein the flat body has a first orientation element disposed adjacent to the through hole, and the first orientation element is adapted to couple with a second orientation element of the external docking element.

7. The portable electronic device as claimed in claim 6, wherein the through hole has an inner wall, and the first orientation element is disposed at the inner wall.

8. The portable electronic device as claimed in claim 6, wherein the flat body has a terminal area on the rear surface and adjacent to the through hole, and the first orientation element is disposed at the terminal area.

9. The portable electronic device as claimed in claim 6, wherein the first orientation element and the second orientation element are a notch and a protrusion respectively or are a protrusion and a notch respectively.

10. The portable electronic device as claimed in claim 1, wherein the flat body has a first latching element disposed adjacent to the through hole and adapted to couple with a second latching element of the external docking element.

11. The portable electronic device as claimed in claim 10, wherein the through hole has an inner wall, and the first latching element is disposed at the inner wall.

12. The portable electronic device as claimed in claim 10, wherein the flat body has a terminal area on the rear surface and adjacent to the through hole, and the first latching element is disposed at the terminal area.

13. The portable electronic device as claimed in claim 10, wherein the first latching element and the second latching element are a protrusion and a groove respectively or are a groove and a protrusion respectively.

14. The portable electronic device as claimed in claim 1, wherein the flat body has a display area on the front surface and a non-display area on the front surface and surrounding the display area, and the through hole is located at the non-display area.

15. The portable electronic device as claimed in claim 1, wherein the through hole is disposed at a corner of the flat body.

16. The portable electronic device as claimed in claim 1, wherein the flat body has a side edge, and the side edge is adapted to lean on the supporting surface when the flat body is supported by the external docking element to stand on the supporting surface.

17. The portable electronic device as claimed in claim 1, wherein the portable electronic device is a tablet personal computer, an electronic reader or a smart phone.

18. A portable electronic device, comprising:
a flat body having a front surface, a rear surface opposite to the front surface, and a through hole passing through the flat body, the through hole extending from the front surface to the rear surface; and
an external docking element having an inserting portion and a stem portion, wherein the external docking element is adapted to couple with the flat body by inserting the inserting portion into the through hole for signal or power transmission and supporting the flat body to stand on a supporting surface.

19. The portable electronic device as claimed in claim 18, wherein the flat body has a plurality of first connection terminals disposed adjacent to the through hole, the external docking element has a plurality of second connection terminals disposed adjacent to the inserting portion, and the first connection terminals are adapted to contact with the second connection terminals for signal or power transmission when the through hole couples with the external docking element.

20. The portable electronic device as claimed in claim 19, wherein the through hole has an inner wall, the first connection terminals are disposed at the inner wall, the inserting portion has an outer wall, and the second connection terminals are disposed at the outer wall.

21. The portable electronic device as claimed in claim 19, wherein the flat body has a terminal area on the rear surface and adjacent to the through hole, the first connection terminals are disposed at the terminal area, the stem portion has a shoulder area adjacent to the inserting portion, and the second connection terminals are disposed at the shoulder area.

22. The portable electronic device as claimed in claim 18, wherein the flat body has a first magnetic element disposed adjacent to the through hole, the external docking element has a second magnetic element disposed adjacent to the inserting portion, and the first magnetic element is adapted to couple with the second magnetic element through a magnetic adsorption.

23. The portable electronic device as claimed in claim 22, wherein the through hole has an inner wall, the first magnetic element is disposed at the inner wall, the inserting portion has an outer wall, and the second magnetic element is disposed at the outer wall.

24. The portable electronic device as claimed in claim 22, wherein the flat body has a terminal area on the rear surface and adjacent to the through hole, the first magnetic element is disposed at the terminal area, the stem portion has a shoulder area adjacent to the inserting portion, and the second magnetic element is disposed at the shoulder area.

25. The portable electronic device as claimed in claim 22, wherein the first magnetic element and the second magnetic element are a permanent magnetic element and a magnetic induction element respectively or are a magnetic induction element and a permanent magnetic element respectively, or both are permanent magnetic elements.

26. The portable electronic device as claimed in claim 22, wherein the flat body has a first orientation element disposed adjacent to the through hole, the external docking element has a second orientation element disposed adjacent to the insertion portion, and the first orientation element is adapted to couple with the second orientation element.

27. The portable electronic device as claimed in claim 26, wherein the through hole has an inner wall, the first orientation element is disposed at the inner wall, the inserting portion has an outer wall, and the second orientation element is disposed at the outer wall.

28. The portable electronic device as claimed in claim 26, wherein the flat body has a terminal area on the rear surface and adjacent to the through hole, the first orientation element is disposed at the terminal area, the stem portion has a shoulder area adjacent to the inserting portion, and the second orientation element is disposed at the shoulder area.

29. The portable electronic device as claimed in claim 26, wherein the first orientation element and the second orientation element are a notch and a protrusion respectively or are a protrusion and a notch respectively.

30. The portable electronic device as claimed in claim 18, wherein the flat body has a first latching element disposed adjacent to the through hole, the external docking element has a second latching element disposed adjacent to the insertion portion, and the first latching element is adapted to couple with the second latching element.

31. The portable electronic device as claimed in claim 30, wherein the through hole has an inner wall, and the first latching element is disposed at the inner wall, the inserting portion has an outer wall, and the second latching element is disposed at the outer wall.

32. The portable electronic device as claimed in claim 30, wherein the first latching element and the second latching element are a protrusion and a groove respectively or are a groove and a protrusion respectively.

33. The portable electronic device as claimed in claim 30, wherein the flat body has a terminal area on the rear surface and adjacent to the through hole, the first latching element is disposed at the terminal area, the stem portion has a shoulder area located between the inserting portion and the stern portion, and the second latching element is disposed at the shoulder area.

34. The portable electronic device as claimed in claim 18, wherein the flat body has a display area on the front surface and a non-display area on the front surface and surrounding the display area, and the through hole is located at the non-display area.

35. The portable electronic device as claimed in claim 18, wherein the through hole is disposed at a corner of the flat body.

36. The portable electronic device as claimed in claim 18, wherein the flat body has a side edge, and the side edge is adapted to lean on the supporting surface when the flat body is supported by the external docking element to stand on the supporting surface.

37. The portable electronic device as claimed in claim 18, wherein the external docking element is a universal serial bus device, an adaptor, a battery or a joystick.

38. The portable electronic device as claimed in claim 18, wherein the portable electronic device is a tablet personal computer, an electronic reader or a smart phone.

* * * * *